United States Patent
Rufino

(10) Patent No.: US 10,954,158 B2
(45) Date of Patent: Mar. 23, 2021

(54) GLASS SHEET WITH ENAMEL REFLECTING INFRARED RADIATION

(71) Applicant: SAINT-GOBAIN GLASS FRANCE, Courbevoie (FR)

(72) Inventor: Benoit Rufino, Courtieux (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 264 days.

(21) Appl. No.: 16/308,596

(22) PCT Filed: Jun. 14, 2017

(86) PCT No.: PCT/FR2017/051534
§ 371 (c)(1),
(2) Date: Dec. 10, 2018

(87) PCT Pub. No.: WO2017/216483
PCT Pub. Date: Dec. 21, 2017

(65) Prior Publication Data
US 2019/0152845 A1    May 23, 2019

(30) Foreign Application Priority Data
Jun. 15, 2016   (FR) ..................... 16 55538

(51) Int. Cl.
*B32B 15/04*    (2006.01)
*B32B 17/06*    (2006.01)
(Continued)

(52) U.S. Cl.
CPC .............. *C03C 17/366* (2013.01); *C03C 8/14* (2013.01); *C03C 17/3417* (2013.01);
(Continued)

(58) Field of Classification Search
CPC . B32B 17/06; B32B 2250/03; B32B 2255/20; B32B 2250/02; B32B 2260/023;
(Continued)

(56) References Cited

U.S. PATENT DOCUMENTS 5,898,180 A      4/1999  Venkataramani et al.
2002/0148255 A1* 10/2002  Vandal .............. B32B 17/10761
                                                        65/105
(Continued)

FOREIGN PATENT DOCUMENTS

EP    2 314 553 A1    4/2011
FR    2 810 029 A1   12/2001
FR    3 010 074 A1    3/2015

OTHER PUBLICATIONS

International Search Report dated Sep. 1, 2017 in PCT/FR2017/051534 filed on Jun. 14, 2017.

*Primary Examiner* — Lauren R Colgan
(74) *Attorney, Agent, or Firm* — Oblon, McClelland, Maier & Neustadt, L.L.P.

(57) ABSTRACT

A glass sheet includes a tempered mineral glass substrate bearing, on one of its faces, a low-emissivity transparent coating and, on this coating, an enamel layer containing one or more ceramic pigments, the enamel layer covering only a portion of the low-emissivity layer and leaving another part thereof free. At least 50% by weight, preferably at least 80% by weight, and in particular at least 95% by weight of the ceramic pigments are chosen from ceramic pigments that reflect near-infrared radiation (NIR) having a reflectance at 1000 nm, determined according to the standard ASTM E 903, at least equal to 40% and a lightness L* of less than 30. It also relates to a process for manufacturing such a sheet and to an oven or refrigerator door containing such a sheet.

20 Claims, 1 Drawing Sheet

(51) Int. Cl.
    *C03C 17/36*     (2006.01)
    *C03C 8/14*      (2006.01)
    *C03C 17/34*     (2006.01)

(52) U.S. Cl.
    CPC ...... *C03C 17/3686* (2013.01); *C03C 2205/02* (2013.01); *C03C 2214/16* (2013.01); *C03C 2217/452* (2013.01); *C03C 2217/485* (2013.01)

(58) Field of Classification Search
    CPC ........ B32B 2264/102; B32B 17/10633; B32B 17/10651; B32B 2264/10; B32B 2264/107; B32B 2255/00; B32B 2255/28; B32B 2307/40; B32B 2307/4026; C03C 2204/04; C03C 2217/70; G02B 1/115; G02B 5/208

USPC .......................... 428/426, 428, 432, 701, 702
See application file for complete search history.

(56) References Cited

U.S. PATENT DOCUMENTS

| | | | |
|---|---|---|---|
| 2003/0186799 A1* | 10/2003 | Beyrle | C03C 8/16 501/14 |
| 2008/0226882 A1* | 9/2008 | Belliot | C03C 17/3435 428/209 |
| 2012/0202023 A1* | 8/2012 | Dusoulier | C03C 17/366 428/210 |
| 2016/0214887 A1 | 7/2016 | Illy et al. | |
| 2017/0204001 A1* | 7/2017 | Maillet | C03C 17/225 |
| 2018/0195736 A1* | 7/2018 | Luckhardt | F24C 15/005 |
| 2019/0152845 A1* | 5/2019 | Rufino | C03C 17/3417 |

* cited by examiner

# GLASS SHEET WITH ENAMEL REFLECTING INFRARED RADIATION

The present invention relates to partially enamelled glass sheets for oven or refrigerator doors and to a process for producing such sheets.

In the field of glazed oven doors or glazed refrigerator doors, whether these are monolithic glazings or glazings having multiple sheets, it is known to cover at least one face of at least one of the glass sheets with a low-emissivity transparent coating in order to improve the thermal insulation of the oven and to reduce the risk of burns in case of contact with the door of the oven when operating.

Furthermore it is customary, for esthetic reasons, to partially opacify the glass sheets with a frame, generally of black color, screen printed on the periphery of the glass sheets.

There is an increasing demand, on the part of oven manufacturers in particular, to have glass sheets having a low-emissivity transparent layer with an opaque enamel frame. For reasons of reducing the production costs, this enamel layer will have to be formed during the step of thermal strengthening of the glass (firing followed by tempering).

However, the creation of a black or dark-colored enamel frame on a low-emissivity glass sheet proves difficult. Specifically, during the heating of the sheet printed on a portion of its surface with a pigmented glass paste, for example with a customary chromium-copper oxide spinel-type black pigment, a flatness defect of the tempered product and the non-compliance of the glass sheet obtained with the fragmentation standard for tempered soda-lime safety glass are frequently observed; the zones covered by the enamel have a different fragmentation profile to those covered by the low-emissivity layer but not covered with enamel, whereas the standard EN 1250-1 requires a homogeneous fragmentation over the whole of the glass sheet.

In certain cases, it may be observed that the glass sheet breaks at the moment of tempering (rapid cooling).

The problems described above do not exist or barely exist in the absence of a low-emissivity transparent coating and are accentuated when the emissivity of the coating decreases. They have been attributed to the difference in absorption of thermal energy, received in the form of infrared radiation, by the zones covered with the low-emissivity coating alone and those covered with the low-emissivity coating and with the enamel layer.

The present invention is based on the discovery that the problems described above can be reduced, or even eliminated, when use is made, for the pigmentation of the enamel, of ceramic pigments that have a high reflectance in the near infrared.

U.S. Pat. No. 5,898,180 discloses enamels intended to be used as internal coating of ovens heated by visible radiation-NIR sources, such as halogen quartz lamps. These enamels are described as having a reflectance in the wavelength range extending from 0.6 μm to 5 μm of greater than 80%. The pigments that reflect visible and infrared radiation listed in this document are $TiO_2$, $ZnO$, $ZrO_2$ and $Sb_2O_3$. These are white pigments which, for esthetic reasons, are unusable for the enamel of oven doors. Specifically, in this field, market demand tends almost exclusively toward enamels of very dark color, preferably black enamels.

The problem underlying the present invention is therefore that of finding pigments that are both highly absorbent in the visible spectrum and sufficiently reflective in the range of the wavelengths of the IR radiation used for heating glazings before the thermal tempering.

Figure 1:
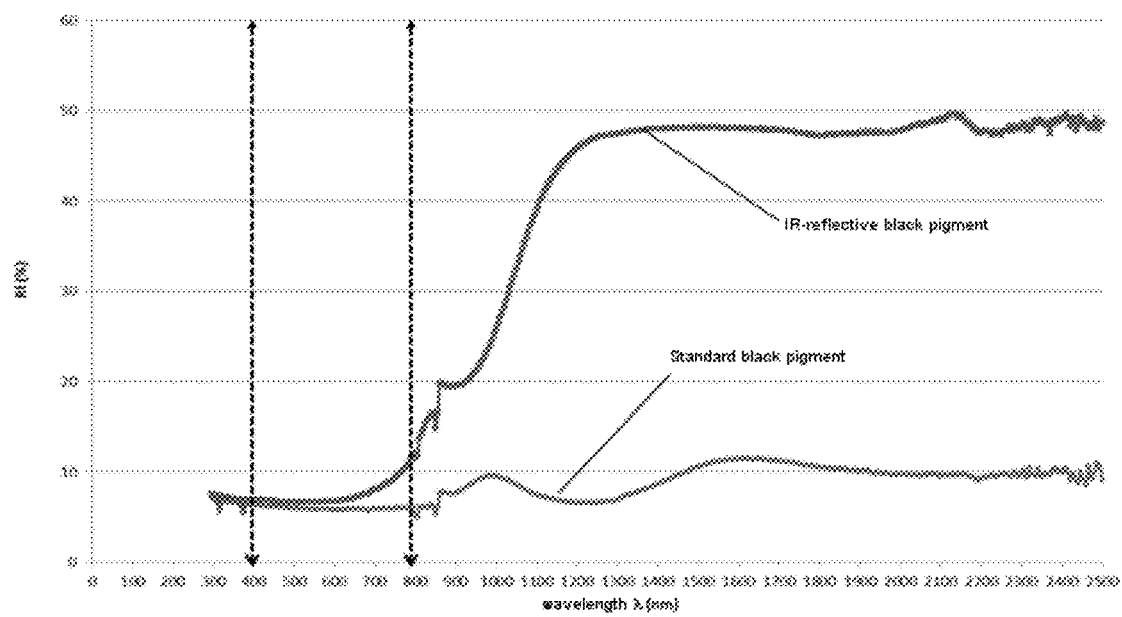
FIG. 1 depicts the reflection spectrum of UV-visible-IR radiation of the comparative enamel containing standard black pigment and of the invention enamel in the example.

A first subject of the present invention is therefore a glass sheet comprising a tempered mineral glass substrate bearing, on one of its faces, a low-emissivity coating and, on this coating, an enamel layer containing one or more ceramic pigments, the enamel layer covering only a portion of the low-emissivity transparent coating and leaving another part thereof free, characterized in that at least 50% by weight of the ceramic pigments are chosen from ceramic pigments that reflect near-infrared radiation (NIR) having a reflectance at 1000 nm, determined according to the standard ASTM E 903, at least equal to 40% and a lightness L* of less than 30. The mineral glass substrate bearing the low-emissivity coating and the enamel layer may in principle be made of any tempered or temperable mineral glass, compatible with use in an oven or refrigerator door. It is preferably a soda-lime glass having a thickness of between 2 and 6 mm, in particular between 2.5 and 4.5 mm.

Low-emissivity coatings are known per se. They are generally formed of one or more layers of a transparent conductive oxide (TCO) such as fluorine-doped or antimony-doped tin oxide, or mixed indium tin oxide. They may also be stacks comprising at least one thin metal layer, for example a silver layer, positioned between dielectric layers.

The thickness of the low-emissivity coatings is generally between 5 and 250 nm, in particular between 5 and 150 nm.

Their emissivity, determined according to the standard ISO 10292:1994 (Annex A), is advantageously between 0.01 and 0.30, preferably between 0.03 and 0.25, in particular between 0.05 and 0.20.

The dark-colored enamel layer covers one portion only of the low-emissivity coating and leaves another portion of this coating free. The surface of the low-emissivity coating covered by the enamel layer preferably represents between 10% and 60%, in particular between 15% and 50%, more preferentially between 20% and 40% of the total surface of the low-emissivity coating. The enamel layer preferably covers the low-emissivity coating over the peripheral portion, close to the edge of the tempered mineral glass sheet, in particular in the style of a frame or a picture mount of dark color extending to the edge face of the glass sheet.

This enamel layer is preferably opaque to visible light.

Its optical density (D), defined by the following formula $$D = -\log l/l_0$$

where l is the energy intensity transmitted over the whole of the spectrum of the visible light and $l_0$ the energy intensity incident over the whole of the spectrum of the visible light, is preferably between 1.8 and 5, in particular between 2.0 and 4, in particular between 2.2 and 3.

The thickness of the enamel layer is advantageously between 5 μm and 40 μm, preferably between 7 μm and 25 μm, and in particular between 10 and 15 μm.

The enamel layer is formed of a vitreous binder and of ceramic pigments. In order to be able to prepare enamels that are as thin and as opaque as possible, it is advantageous to increase the volume fraction of ceramic pigments of the enamel as much as possible. Beyond a certain limit, an increase in the pigment content results however in insufficient cohesion and a mechanical weakening of the enamel layer. For this reason, the total content of ceramic pigments of the enamel layer should not generally exceed around 40% by weight.

In one preferred embodiment, the total content of ceramic pigments of the enamel layer is between 20% and 40% by weight, preferably between 30% and 39% by weight and in particular between 35% and 38% by weight, relative to the total weight of the enamel layer.

Not all the ceramic pigments contained in the enamel layer are necessarily pigments that reflect infrared radiation as defined above. In order to observe the beneficial effects of the use of such pigments, it is however necessary that they represent at least 50% by weight of all of the ceramic pigments present. Preferably, they represent at least 80% by weight, and in particular at least 90% by weight, ideally at least 95% by weight of all of the ceramic pigments present.

In order to effectively reflect the infrared radiation, the particles of ceramic pigments must not be too small. Their diameter is advantageously of the same order of magnitude as the wavelength of the infrared radiation reflected.

The NIR-reflective pigments used in the present invention are therefore advantageously formed of particles having a mean diameter of between 500 nm and 10 μm, preferably between 600 nm and 5.0 μm, in particular between 700 nm and 3 μm.

As indicated in the introduction, the NIR-reflective ceramic pigments used in the present invention are of dark color, preferably of a color close to black. They are therefore different from the white pigments described in U.S. Pat. No. 5,898,180 which very effectively reflect both the visible light and the near-infrared radiation (diffuse reflectance in the infrared of greater than 80%).

The hue of a colorant or pigment is conventionally defined in the CIE L*a*b* color space which is defined by three quantities (L*, a* and b*) of which the first L* denotes the lightness. The value of L* ranges from 0 for black to 100 for white.

The lightness L* of the ceramic pigments that reflect NIR radiation that are used in the present invention is preferably between 1 and 20, in particular between 2 and 10.

As examples of dark-colored ceramic pigments that reflect near-infrared radiation (NIR) that can be used in the present invention, mention may be made of the following products:

- Al- and Ti-doped chromium hematites sold under the names V-780 Cool Colors IR Brown Black and V-799 Cool Colors IR Black by the company Ferro,
- copper-chromium-manganese black spinels (CI Pigment Black 28) sold under the trade names 7890 Meteor Black and 9875 Meteor Plus HS Jet Black by the company BASF, or Black 411 by the company Shepherd,
- copper-chromium-manganese-barium spinels (CI Pigment Black 28) available under the names Meteor Plus Jet Black (BASF), Heucodur Brown 869 (Heubach), Heucodur Black 953 (Heubach), Heucodur Black 963,
- chromium oxide hematites (CI Pigment Green 17) available from the company Ferro under the names GEODE V-774 Cool Colors HS Black, GEODE V-775 Cool Colors IR Black, GEODE V-776 Cool Colors IR Black, GEODE V-778 Cool Colors IR Black, GEODE 10204 IR Eclipse IR Black, and O-1775B Ebony, or from the company Shepherd under the names Black 10C909 and Black 30C940;
- chromium-iron-nickel black spinels (CI Pigment Black 30) sold by the company Ferro under the name GEODE 10456 Black or by the company Heubach under the name Heucodur Black 950;
- iron-chromium oxide spinels (CI Pigment Brown 29) sold by the company Shepherd under the trade name Black 411, or by the company BASF under the trade names 9880 Meteor Plus High IR Jet Black, 9882 Meteor Plus Black, 9887 Meteor Plus High IR Black, 9889 Meteor Plus High IR Black;
- cobalt-chromium-iron spinels (CI Pigment Black 27) available under the name Heucodur Black 955 (Heubach);
- copper-chromium-iron spinels (CI Pigment Black 28) available under the name Heucodur Black 9-100 (Heubach);
- chromium oxide hematite (CI Pigment Green 17) available under the name Heucodur Black 910 (Heubach);
- iron-chromite black spinels (CI Pigment Brown 35) available under the names 7895 Meteor High IR Black, Heucodur Black 920 (Heubach) and Heucodur Black 940 (Heubach);
- iron-chromium-manganese spinels (CI Pigment Brown 29) available under the names 9880 Meteor High IR Black, 9882 Meteor Plus Black, 9887 Meteor Plus High IR Black, 9889 Meteor Plus High IR Black,
- chromium-free manganese, bismuth, strontium and/or vanadium spinels, available under the names GEODE 10201 Eclipse Black (Ferro), GEODE 10202 Eclipse Black (Ferro) and GEODE 10203 Eclipse Black (Ferro).

Among these pigments, iron chromites (CI Pigment Brown 35 and CI Pigment Brown 29) and iron-nickel chromites (CI Pigment Black 30) are very particularly preferred.

The vitreous binder which constitutes at least 60% by weight of the enamel layer provides the connection between the particles of pigments and the adhesion of the enamel layer to the low-emissivity coating. The binder is generally obtained by melting a glass frit having a softening point at least 50° C. below the temperature to which the glass sheet is heated before the thermal tempering. The softening point of the vitreous binder is preferably below 590° C.

The reflectance at 1000 nm (measured according to ASTM E 903) of the enamel layer of the present invention, based on the vitreous binder and on the ceramic pigments as defined above, is preferably greater than 13%, in particular greater than 15%, and more preferentially greater than 18%. It is generally less than 70%.

Another subject of the present invention is an oven door comprising at least one glass sheet according to the invention as described above.

This oven door is in particular a glazing with multiple sheets in which, when the door is fitted on the front of the cavity of the oven, the low-emissivity transparent coating is preferably facing toward the cavity of the oven.

In such an oven closed by a glazing with multiple sheets, the tempered glass sheet of the present invention preferably comprises a soda-lime glass substrate and is preferably placed so as not to be in direct contact with the cavity of the oven. Specifically, it is preferable to insert, between the cavity of the oven and the glass sheet of the present invention, a glass sheet that is relatively more resistant to the temperature variations than a soda-lime glass sheet.

In one embodiment, the oven door of the present invention further comprises a sheet made of borosilicate glass or made of soda-lime glass coated with a low-emissivity layer, placed between the cavity of the oven and the glass sheet according to the invention, thus separating the latter from the cavity of the oven.

Another subject of the present invention is a refrigerator door comprising at least one glass sheet according to the invention as described above.

A final subject of the present invention is a process for manufacturing a glass sheet for an oven or refrigerator door comprising a tempered mineral glass substrate bearing, on one of its faces, a low-emissivity coating and, on this coating, an enamel layer containing one or more ceramic pigments, said process comprising the following steps:

providing a mineral glass substrate bearing, on at least one of its faces, a low-emissivity transparent coating;

applying, on a portion only of the low-emissivity transparent coating, a pigmented glass paste comprising a glass frit and one or more ceramic pigments, at least 50% by weight, preferably at least 80% by weight, and in particular at least 95% by weight of the ceramic pigments being chosen from ceramic pigments that reflect near-infrared radiation (NIR) having a reflectance at 1000 nm, determined according to the standard ASTM E 903, at least equal to 40% and a lightness L* of less than 30;

irradiating the glass sheet thus obtained by means of NIR radiation sources so as to heat it to a temperature close to its softening point;

thermal tempering of the glass sheet.

The mineral glass substrate is preferably a float glass, precut to the dimensions of the oven or refrigerator door into which the glass sheet must be integrated. It is covered on at least one face, preferably on both faces, with a low-emissivity transparent coating, for example a transparent conductive oxide deposited by magnetron sputtering or by chemical vapor deposition (CVD).

A pigmented glass paste is prepared in a known manner by mixing a finely ground glass frit with a solution of a polymer in an organic solvent and with the ceramic pigment(s).

The glass paste is then applied, for example by screen printing, on a portion of the low-emissivity transparent coating at a wet thickness of several tens of micrometers.

After drying of the printed layer, the assembly is brought in a few minutes to a temperature of between 600° C. and 800° C. then tempered in a continuous or oscillating tempering furnace.

EXAMPLE

Two glass pastes are prepared having the composition by weight indicated in the table below

|  | Comparative | According to the invention |
|---|---|---|
| Frit | 50% | 50% |
| IR-reflective pigment (Fe—Cr) | — | 30% |
| Standard black pigment (Cu—Cr) | 30% | — |
| Solvent + polymer | 20% | 20% |

These two pastes are screenprinted in the form of a frame at the edge of a soda-lime glass substrate (dimensions 50 cm×50 cm) bearing on each of its faces a coating (SGG EkoVision II) having an emissivity of 0.2 and which is formed of the following series of layers: Glass//$Si_3N_4$/$SiO_2$/ITO/$Si_3N_4$/$SiO_2$/TiOx.

The viscosity of the pastes is around 80 poise and the thickness of the layers is around 27 µm. The printed substrates are then dried in an infrared furnace at a temperature of around 130° C. until the complete evaporation of the organic solvent.

The two glass sheets are then brought over a period of 4 minutes to a temperature of 670° C. by means of electrical resistors emitting infrared radiation having wavelengths up to around 5 µm, then cooled abruptly using a stream of cold air.

FIG. 1 shows the reflection spectrum of the UV-visible-IR radiation of the enamel containing the standard black pigment and of the enamel containing the black pigment that reflects IR radiation.

When the comparative glass sheet is subjected to a fragmentation test according to the standard EN 1250-1, it is observed that the pieces of glass are significantly smaller in the zone covered by the black enamel than in the zone covered only by the low-emissivity coating. The difference in size between the zones is such that the glass sheet is judged to not comply with the fragmentation test.

Figure 2:
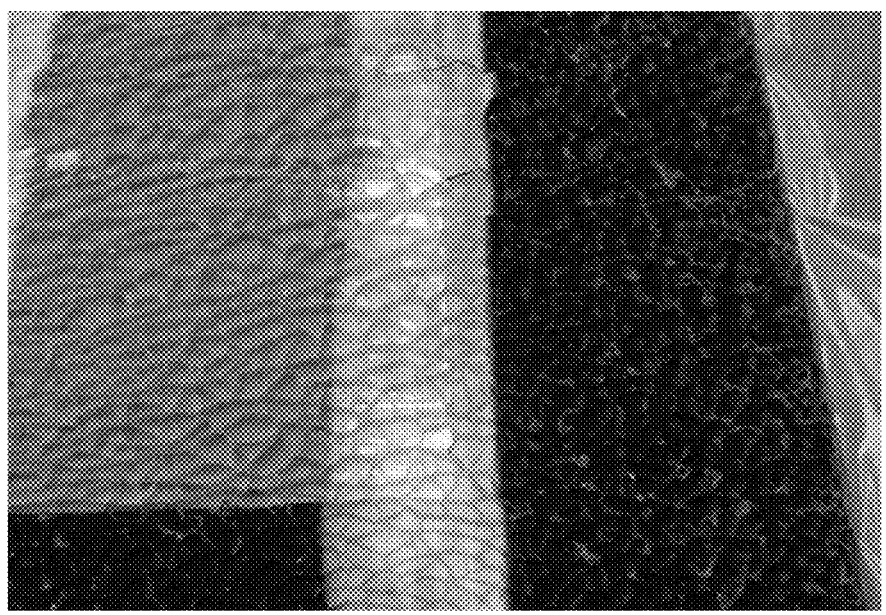
FIG. 2 is a photo of an invention glass sheet after fragmentation according to standard EN 1250-1.

When the enamelled glass sheet according to the invention is subjected to the same fragmentation test according to the standard EN 1250-1, the pieces of glass in the zones covered by the enamel have dimensions similar to those observed in the zones not covered by the enamel. FIG. 2 shows a photo of such a glass sheet according to the invention after fragmentation according to the standard EN 1250-1.

The invention claimed is:

1. A glass sheet comprising:
   a tempered mineral glass substrate bearing, on one of its faces, a low-emissivity transparent coating and, on the coating, an enamel layer containing one or more ceramic pigments, the enamel layer covering only a portion of the low-emissivity coating,
   wherein at least 50% by weight of the ceramic pigments are chosen from ceramic pigments that reflect near-infrared radiation (NIR) having a reflectance at 1000 nm, determined according to the standard ASTM E 903, at least equal to 40% and a lightness L* of less than 30.

2. The glass sheet as claimed in claim 1, wherein the total content of ceramic pigments of the enamel layer is between 20% and 40% by weight, relative to the total weight of the enamel layer.

3. The glass sheet as claimed in claim 2, wherein the total content of ceramic pigments of the enamel layer is between 35% and 38% by weight, relative to the total weight of the enamel layer.

4. The glass sheet as claimed in claim 1, wherein the lightness L* of the ceramic pigments reflecting the NIR radiation is between 1 and 20.

5. The glass sheet as claimed in claim 4, wherein the lightness L* of the ceramic pigments reflecting the NIR radiation is between 2 and 10.

6. The glass sheet as claimed in claim 1, wherein the ceramic pigment or pigments reflecting the NIR radiation are chosen from the group consisting of CI Pigment Black 27, CI Pigment Black 28, CI Pigment Black 30, CI Pigment Green 17, CI Pigment Brown 29, CI Pigment Brown 35, Al- and Ti-doped chromium oxide hematite, chromium-free manganese, bismuth, strontium, and/or vanadium oxide spinel, and mixtures thereof.

7. The glass sheet as claimed in claim 1, wherein the pigment or pigments reflecting the NIR are chosen from iron chromites and iron nickel chromites.

8. The glass sheet as claimed in claim 1, wherein the enamel layer has a thickness of between 5 μm and 40 μm.

9. The glass sheet as claimed in claim 8, wherein the enamel layer has a thickness of between 10 μm and 15 μm.

10. The glass sheet as claimed in claim 1, wherein the enamel layer covers the peripheral portion of the low-emissivity coating close to the edge of the tempered mineral glass substrate.

11. The glass sheet as claimed in claim 1, wherein the pigments reflecting the NIR are formed of particles having a mean diameter of between 500 nm and 10 μm.

12. The glass sheet as claimed in claim 11, wherein the pigments reflecting the NIR are formed of particles having a mean diameter of between 700 nm and 3 μm.

13. The glass sheet as claimed in claim 1, wherein the enamel layer has a reflectance at 1000 nm (measured according to ASTM E 903) of greater than 13%.

14. The glass sheet as claimed in claim 1, wherein the low-emissivity coating has an emissivity, determined according to the standard ISO 10292:1994 (Annex A), of between 0.01 and 0.30 preferably between 0.03 and 0.25, in particular between 0.05 and 0.20.

15. The glass sheet as claimed in claim 1, wherein at least 95% by weight of the ceramic pigments are chosen from ceramic pigments that reflect near-infrared radiation (NIR) having a reflectance at 1000 nm, determined according to the standard ASTM E 903, at least equal to 40% and a lightness L* of less than 30.

16. An oven door comprising:
at least one glass sheet as claimed in claim 1.

17. The oven door as claimed in claim 16, wherein the oven door is a glazing having multiple glass sheets and, when the oven door is fitted to an oven, the low-emissivity coating of each glass sheet faces toward a cavity of the oven.

18. The oven door as claimed in claim 17, wherein a sheet made of borosilicate glass or made of soda-lime glass coated with a low-emissivity coating is placed between the glass sheet and the cavity of the oven, thus separating the glass sheet from the cavity of the oven.

19. A refrigerator door comprising:
at least one glass sheet as claimed in claim 1.

20. A process for manufacturing a glass sheet as claimed in claim 1, the process comprising:
providing a mineral glass substrate bearing, on at least one of its faces, a low-emissivity transparent coating;
applying, on a portion only of the low-emissivity transparent coating, a pigmented glass paste comprising a glass frit and one or more ceramic pigments, at least 50% by weight of the ceramic pigments being chosen from ceramic pigments that reflect near-infrared radiation (NIR) having a reflectance at 1000 nm, determined according to the standard ASTM E 903, at least equal to 40% and a lightness L* of less than 30;
irradiating the glass sheet thus obtained by means of NIR radiation sources so as to heat the glass sheet to a temperature close to a softening point of the glass sheet; and
thermal tempering of the glass sheet.

* * * * *